United States Patent [19]

Iwata

[11] 4,371,060
[45] Feb. 1, 1983

[54] PAD CLIP FOR DISC BRAKE

[75] Inventor: Yoichi Iwata, Saitama, Japan

[73] Assignee: Akebono Brake Industry Co., Ltd., Tokyo, Japan

[21] Appl. No.: 234,551

[22] Filed: Feb. 13, 1981

[51] Int. Cl.³ .............................................. F16D 65/02
[52] U.S. Cl. .................................................. 188/73.38
[58] Field of Search ................. 188/1.11, 73.35, 73.36, 188/73.37, 73.38

[56] References Cited

U.S. PATENT DOCUMENTS 4,181,200  1/1980  Souma .............................. 188/73.38

FOREIGN PATENT DOCUMENTS 2017237  10/1979  United Kingdom ............. 188/73.38

Primary Examiner—Duane A. Reger
Attorney, Agent, or Firm—Toren, McGeady and Stanger

[57] ABSTRACT

An improvement in the arrangement of pad clips provided between a support and friction pads of a disc brake. Each pad clip is interposed in between guide grooves of the support and protruding parts of each friction pad in such a way as to provide anti-rattling forces with a less number of parts than the conventional arrangement; to provide a guiding face for the friction pad; and to facilitate assembly work.

5 Claims, 5 Drawing Figures

PAD CLIP FOR DISC BRAKE

BACKGROUND OF THE INVENTION

1. Field of the Invention

This invention relates to an improvement on pad clips of a disc brake.

2. Description of the Prior Art

Generally, in the disc brake of the type having a fixed support arranged to carry friction pads to be pushed against a disc, the support which is formed into a flat plate shape and is disposed on one side of the disc in parallel with the disc is provided with a recess; the recess opens toward the outside of the diameter of the disc and is arranged to have each friction pad disposed therein; and, at the two sides of each friction pad, there are provided protrusions which are arranged to engage guide grooves provided in the support. These two sides of the friction pad and the engaging parts of the support are generally formed to serve as friction pad guiding faces for guiding the friction pads in the axial direction of the disc. Further, to prevent the friction pads from rattling when the brake is not applied, there are also provided anti-rattle springs in general.

In the accompanying drawings, FIGS. 1(A), (B) and (C) show, by way of example, the above stated conventional arrangement for carrying a friction pad. Confronting guide grooves 2 are formed in both sides of a recess 1a provided in a support 1. Meanwhile, each friction pad 3 is provided with a pair of protrusions 4 which are formed at both sides of the friction pad 3 and are arranged to engage the above stated guide grooves 2. Between the confronting faces of the friction pad 3 and the support 1, there are interposed pad clips 5, 6 and 7. The pad clips 5, 6 and 7 are arranged to form guiding faces for the friction pad 3 and to prevent the friction pad from rattling. A guiding face is formed with the pad clip 5 attached to the guide grooves 2 of the support 1. The friction pad 3 is pressed in the right direction as viewed on FIG. 1(A). by the spring force of the pad clip 6 while it also serves to form a guiding face. Another pad clip 7 which engages the bottom part of the friction pad 3 exerts a spring force to push it toward the outside of the diameter of a disc which is not shown. By this arrangement, the friction pad 3 is stably placed within the recess 1a of the support 1 without rattling there.

Meanwhile, it is of course preferable that the structural arrangement of such a device comprises a less number of parts and components and has good workability for assembly work thereon. The present invention has resulted from studies for friction pad suppporting arrangement and is directed to an improvement in this respect.

SUMMARY OF THE INVENTION

It is therefore a general object of the invention to provide an improvement on the pad clips of a disc brake characterized by the following arrangement: In the conventional arrangement shown in FIG. 1, spring forces are exerted both in the rotating direction of a disc (in the tangential direction) and in the direction of diameter thereof for the purpose of preventing the friction pad 3 from rattling. The pad clips 6 and 7 are provided for this purpose. Whereas, in accordance with the present invention, the spring force to be exerted in the direction of diameter of the disc is obtained by a pad clip interposed in between each of the left and right protrusions 4 of the friction pad 3 and each of the U-shaped guide grooves 2 of the support 1. This arrangement dispenses with the pad clip 7 of the conventional arrangement and thus permits reduction in the number of parts required. Besides, this point of improvement in the spring function of the pad clip is arranged to bring about also improvement in the workability for assembly work on a support 1.

The above and further objects, features and advantages of the invention will become apparent from the following detailed description of a preferred embodiment thereof taken in connection with the accompanying drawings.

DETAILED DESCRIPTION OF PREFERRED EMBODIMENT

Figure 1A:
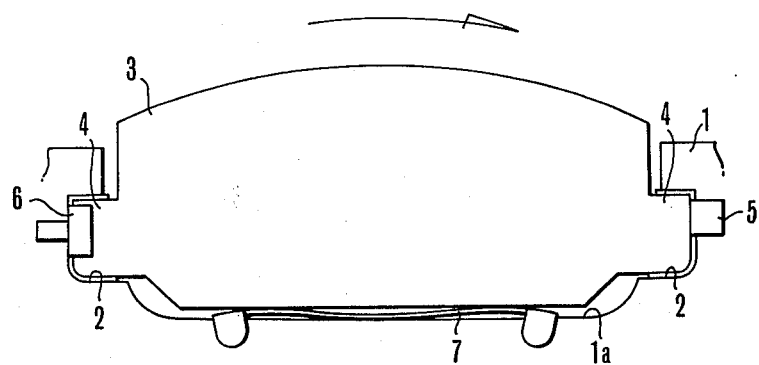
FIG. 1(A) is a front view showing an example of the conventional pad mounting arrangement.
Figure 1B:
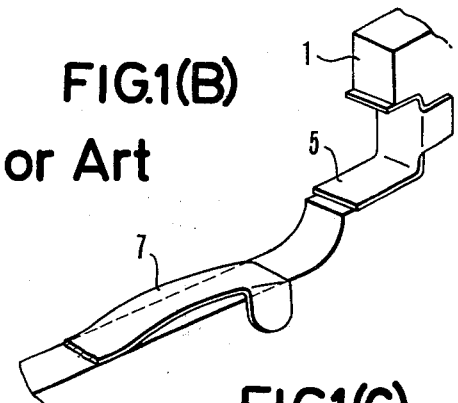
FIG. 1(B) is an oblique view showing the right half portion of the conventional arrangement.
Figure 1C:
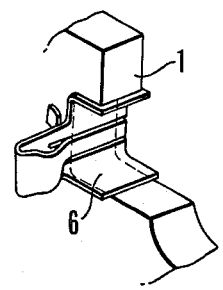
FIG. 1(C) is an oblique view showing the left half portion of the conventional arrangement.
Figure 2A:
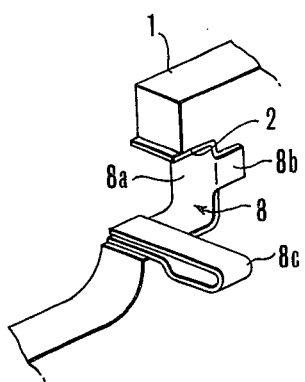
FIG. 2(A) is an oblique view showing a pad clip as an embodiment of the present invention.

FIGS. 2(A) and (B) show a pad clip formed in accordance with the present invention showing it as in a state of being mounted. The pad clip 8 is made of either a stainless material such as stainless steel or a fiber reinforced plastic material. The pad clip 8 comprises a U-shaped clip body 8a which is arranged to cover the whole surface of the guide groove 2 of a support 1; a pair of mounting claw parts 8b which are arranged to support the support 1 in the direction of thickness thereof; and a spring part 8c which extends away from a disc in the direction of the axis thereof and is bent to a point close to the disc.

Figure 2B:
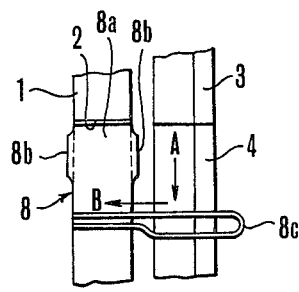
FIG. 2(B) is a side view showing the same embodiment of the invention.

The spring part of 8c is a strip-like section and has a first part and a second part with the first part connected to and extending transversely of the one of the legs of the clip body 8a located closer in the radial direction to the axis of the disc. The second part is reversely bent relative to an is in superposed juxtaposed relation to the first part. The second part extends rectilinearly in the axial direction of the disc brake. This spring part 8c also serves as guide face to be used in mounting a friction pad 3. In other words, the bent of the spring part 8c prevents the friction pad 3 from rattling by pushing a protruding part 4 of the friction pad 3 toward the outside of the radius of the disc. Further, the extension of the spring part 8c in the axial direction of the disc facilitates mounting work for mounting the friction pad 3 on the support 1 by pushing the friction pad in the direction of an arrow B as shown in FIG. 2(B) into the groove 2 of the support 1 after the protruding part 4 of the friction pad 3 is placed on the spring part 8c in the direction of an arrow A shown in FIG. 2(B).

In this particular embodiment, pad clips 8 are arranged to be fitted into two guide grooves 2 of the support 1. However, the pad clips 8 may be used in combination with the conventional pad clips 6.

As described in the foregoing, in accordance with the present invention, each pad clip forms a friction pad guiding face in a disc brake. The pad clip also has an anti-rattle spring force. Besides, it facilitates friction pad mounting work. These are great advantages of the invention for practical applications thereof.

What is claimed is:

1. A pad clip for use with a disc brake and arranged to be interposed between a U-shaped guide groove in a support and a protruding part of a friction pad, said pad clip comprising a U-shaped clip body having a pair of oppositely spaced legs and a bottom part interconnecting said legs, said clip body arranged to be secured in the correspondingly U-shaped guide groove in the support, a spring part secured to the end of one of said legs of said clip body spaced from said bottom part and extending transversely of and outwardly from said leg, said spring part secured to the one of said legs arranged to be located radially inwardly with respect to the other of said legs relative to the axis of the disc brake, said spring part is a strip-like section with a first part extending outwardly from the one of said legs generally in the direction of the axis of the disc brake and away from the disc brake, and a second part reversely bent relative to said first part extending generally in the direction of the axis of the disc brake and toward the disc brake with said second part disposed in spaced juxtaposed relation to said first part.

2. A pad clip according to claim 1, wherein said spring part is arranged to push said friction pad in the direction of radius of said disc.

3. A pad clip according to claim 1, wherein said clip body is arranged to cover the whole surface of said guide groove.

4. A pad clip according to claim 3 said pad clip being made of a stainless material.

5. A pad clip according to claim 1, wherein said second part of said spring part extends rectilinearly in the axial direction of the disc brake.

* * * * *